UNITED STATES PATENT OFFICE.

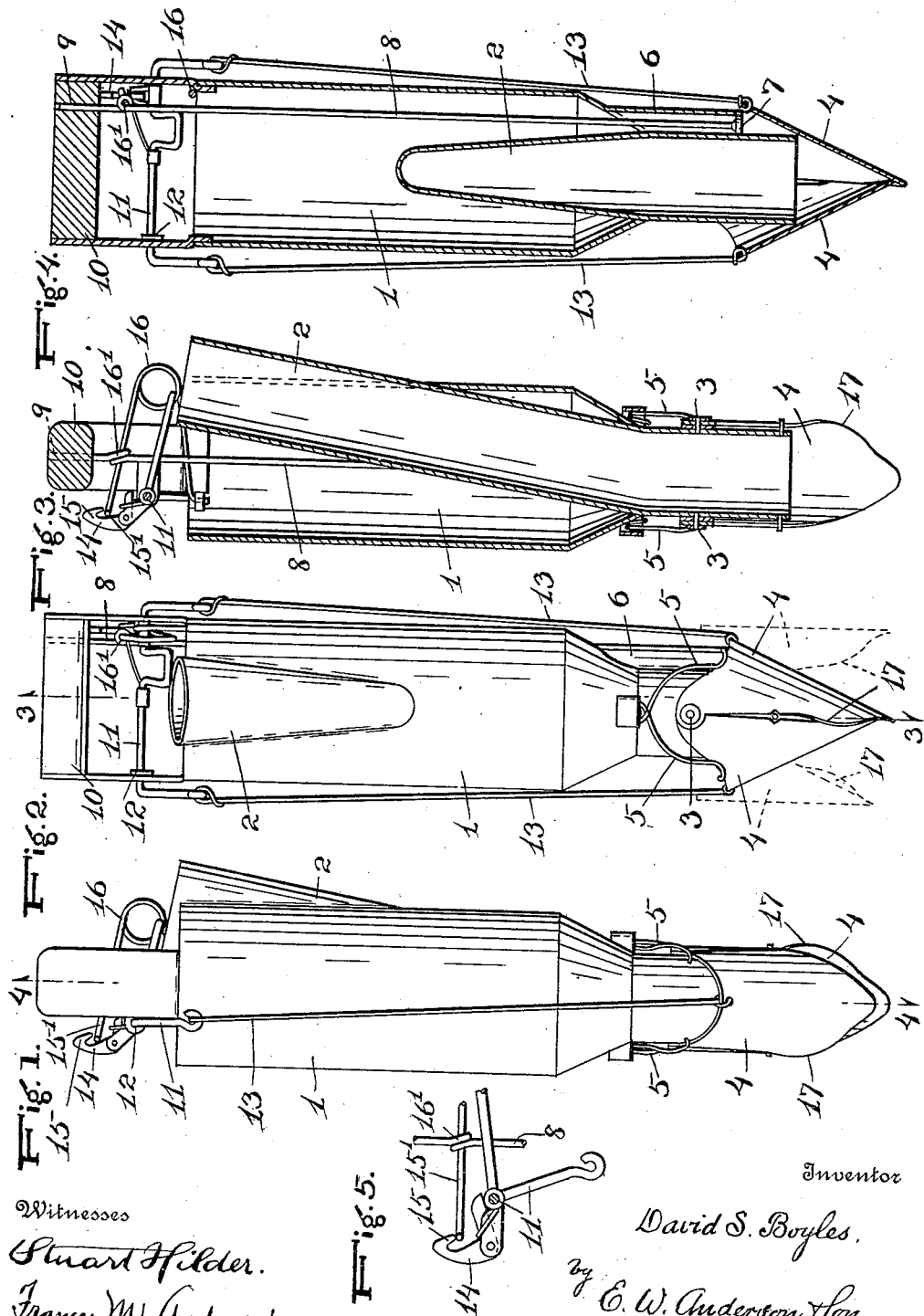

DAVID S. BOYLES, OF WALNUT COVE, NORTH CAROLINA.

IMPLEMENT FOR REPLANTING AND TRANSPLANTING SMALL PLANTS.

1,098,221.

Specification of Letters Patent.  Patented May 26, 1914.

Application filed July 14, 1913. Serial No. 779,027.

*To all whom it may concern:*

Be it known that I, DAVID S. BOYLES, a citizen of the United States, resident of Walnut Cove, in the county of Stokes and State of North Carolina, have made a certain new and useful Invention in Implements for Replanting and Transplanting Small Plants; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is an end view of the invention. Fig. 2 is a side view of the same, the jaws being shown as opened in dotted lines. Fig. 3 is a section on the line 3—3, Fig. 2. Fig. 4 is a section on the line 4—4, Fig. 1. Fig. 5 is a detail side view of the lever 11 and parts adjacent thereto, the lever being shown as actuated to open the jaws.

The invention has relation to an implement for use in replanting or transplanting small plants and at the same time providing them with the necessary water, and it consists in the novel construction and combinations of parts as hereinafter set forth.

In the accompanying drawings illustrating the invention, the numeral 1 designates a reservoir for water forming the body of the implement. Located within and suitably connected to said body is a tube 2 of smaller diameter than the reservoir and of greater length, the lower end of the tube extending below the reservoir. At the lower end portion of the tube are pivoted at 3, a pair of scoop form converging jaws 4, 4, normally closed by a spring 5, to provide a thin edge at the lower end for ready insertion into the soil. A water tube 6 has communication with the bottom of the reservoir and extends downwardly usually to near the lower end of the tube 2 within one of the scoop jaws, a valve 7 being provided to control the lower end of the water tube. A valve rod 8 extends upwardly within the reservoir and may have at its upper end guiding engagement with a perforation 9 of the reservoir handle 10. A lever 11 is pivoted at 12 to the upper end portion of the reservoir and has an operating rod connection 13 with each of the scoop jaws, whereby upon actuation of the lever the jaws will be opened against the tension of their spring, which will close the jaws upon release of the lever.

Means are provided to operate the valve rod and open the valve upon actuation of the lever, consisting preferably of a pivoted catch 14, carried by the lever and having engagement at its hooked end 15 with the end of the arm 15' of a spring 16, said spring having through said arm engagement with the valve rod at 16'. In this way the hooked end of the catch will depress the valve rod and valve upon actuation of the lever until said hooked end slides off of the end of the arm 15' of the spring, when the valve will be immediately released and returned to normal closed position upon reaction of the released spring to shut off the supply of water to the plant.

In the use of the invention, the reservoir is first filled with water, the implement being then inserted at its lower end into the earth to the depth proper, and the plant placed in the tube 2 sliding down within said tube to the lower end thereof, where it is stopped by the converging jaws. The lever is now operated to open the jaws and spread the soil away to form an opening or hole for the plant, which slides down into said hole between the opened jaws, the valve being at the same time opened to supply a sufficient amount of water to the plant, when the valve is automatically closed to shut off the water.

Usually the scoop jaws will be provided with lateral reverse bends 17 one at each side of each jaw and oppositely disposed, so that upon turning the planter slightly to the right the opened jaws will act to throw the soil to the plant.

What I claim is:—

1. An implement of the class described, comprising a water reservoir, a plant tube within and connected to the reservoir, a pair of converging normally closed jaws at the lower end of and closing said tube, an operating lever at the upper end of the implement having rod connections with said jaws to open the same, a water tube extending downwardly from said reservoir within one of said jaws and provided with a valve, and means including an actuating device carried by said lever for opening said valve simultaneously with the opening of the jaws.

2. An implement of the class described, comprising a water reservoir, a plant tube within and connected to the reservoir, a pair of converging normally closed jaws at the lower end of and closing said tube, an operating lever having rod connections with said jaws to open the same, a water tube extending downwardly from the reservoir within one of said jaws and provided with a valve, a valve rod, a spring, and a catch carried by said lever engaging said spring to open said valve when the jaws are opened.

3. An implement of the class described, comprising a water reservoir, a plant tube, a pair of pivoted converging jaws at the lower end of and closing said tube, an operating lever having rod connections with said jaws to open the same, a water tube extending downwardly from the reservoir within one of said jaws and provided with a valve, a valve rod, a spring having an arm engaging said valve rod, and a catch carried by said lever engaging said arm to open the valve when the jaws are opened and to release the valve rod toward the end of the movement of the lever.

In testimony whereof I affix my signature in presence of two witnesses.

DAVID S. BOYLES.

Witnesses:
R. D. JOYCE,
J. E. JAMES.

Copies of this patent may be obtained for five cents each, by addressing the "Commissioner of Patents, Washington, D. C."